United States Patent Office 3,389,026
Patented June 18, 1968

3,389,026
PLASTICIZED HIGH EXPLOSIVE AND SOLID PROPELLANT COMPOSITIONS
Oliver H. Johnson, Silver Spring, Md., assignor to the United States of America as represented by the Secretary of the Navy
No Drawing. Filed Dec. 8, 1959, Ser. No. 858,295
9 Claims. (Cl. 149—19)

The invention described herein may be manufactured and used by or for the Government of the United States of America for governmental purposes without the payment of any royalties thereon or therefor.

This application relates to the field of explosives and propellants and is more particularly concerned with a novel explosive or propellant containing a solid solution or colloidal mixture of a solid organic oxidizer and a nitrated plastic fuel.

During the past decade, many new poly nitro aliphatic compounds have been discovered and tested. These aliphates, many of which are derivatives of nitroform, contain available oxygen in amounts never before attained in solid explosive compounds. It has been found that these solid high oxygen explosives are extremely sensitive to impact. Furthermore, they cannot be properly desensitized by the standard techniques of wax coating or suspension in TNT unless excessive amounts of the desensitizer is employed. This is probably because small amounts of the desensitizer act merely as a fuel for the excess oxygen in these high oxygen explosives (HOX) producing even more energetic decomposition. The use of HOX compounds has therefore been restricted despite their desirable oxygen-carbon, hydrogen ratios.

One problem encountered in the formulation of a solid propellant rocket motor is to increase the specific impulse of the motor while avoiding the risk of dangerously increasing the sensitvity and explosive power of the motor. Furthermore, the addition of large amounts of oxidizing agents such as ammonium perchlorate and nitro glycerine to the polymeric material called the fuel which gives body to the propellant and serves as a source of combustible material results in a propellant having poor physical properties. That is to say, a propellant containing sufficient oxidizer to yield a satisfactory specific impulse may contain insufficient fuel to permit adequate bonding of the motor to the casing. Furthermore, the tensile strength and elongation characteristics of such propellants are invariably marginal and they tend to be unduly brittle. This may result in voids and fissures in the propellant grain causing erratic burning or even explosion of the motor. On the other hand, when the physical properties are improved by decreasing the ratio of oxidizing agent to polymer, the specific impulse of the formulation is necessarily decreased.

It is an object of this invention therefore to provide a new and improved method of desensitizing a solid high-oxygen explosive.

Another object is to provide a new explosive composition containing a poly nitro aliphatic oxidizer which composition is not overly sensitive and which possesses great explosive force.

A further object is the provision of a new solid propellant composition which has a high specific impulse combined with good physical properties.

These and many other objects will become more readily apparent when the following specification is read and understood.

The essential feature of this invention resides in actually dissolving or colloiding solid polynitro aliphatic oxidizers in a polymeric fuel which itself contains available oxygen.

It has been found that the pure crystalline polynitro alyphatic oxidizer or explosive completely loses its original crystalline from when it is colloided in the nitropolymer. Since the oxidizer is virtually in molecular contact with the polymeric fuel, the entire mass acts like a pure compound. That is, burning, deflagration and detonation occur smoothly and rapidly. At the same time, the sensitivity of the composition is markedly decreased. Aluminum, boron, magnesium and silicon may be added to increase the energy of the composition.

Generally, compositions made according to the principles of this invention containing from 25% to 50% polynitro aliphatic (oxidizer) act as propellants while those containing 40–70% oxidant are high explosives.

The following Table I is a tabulation of representative solid explosives or oxidizers which may be used in practicing this invention.

TABLE I.—HIGH OXYGEN EXPLOSIVES, HOX's

| Symbol | Name | Chemical Structure | Empirical Formula | Molecular Weight | Melting Point, °C. | Crystal Density, g./cc. | Impact [1] Sensitivity, cm. | Calc. Heat [2] of Formation, kcal./mol | Oxygen Content [3] Above CO lev. | $CO_2$ lev. |
|---|---|---|---|---|---|---|---|---|---|---|
| BTNEN | Bis(trinitroethyl) nitramine. | $(C(NO_2)_3CH_2)_2NNO_2$ | $C_4H_4N_8O_{14}$ | 388 | 94 | 1.96 | 10 | +12 | 48.5 | 97 |
| TNEOC | Trinitroethyl orthocarbonate. | $(C(NO_2)_3CH_2O)_4$—C— | $C_9H_8N_{12}O_{28}$ | 732 | 169 | 1.84 | 8 | −183 | 48.8 | 122 |
| BTNEC | Bis(trinitroethyl) carbonate. | $(C(NO_2)_3CH_2O)_2$—CO— | $C_5H_4N_6O_{15}$ | 388 | 117 | 1.88 | 16 | −167 | 48.5 | 219 |
| TNEF | Trinitroethyl formal. | $(C(NO_2)_3CH_2O)_2$—$CH_2$ | $C_5H_6N_6O_{14}$ | 374 | 65 | 1.73 | 8 | −103 | 62.3 | |
| TNEOF | Trinitroethyl orthoformate. | $(C(NO_2)_3CH_2O)_3CH$ | $C_7H_7N_9O_{21}$ | 553 | 128 | 1.83 | 8 | −140 | 52.6 | 158 |
| NG | Nitroglycerine | $O_3NCH_2CH(NO_3)CH_2NO_3$ | $C_3H_5N_3O_9$ | 227 | 13 | 1.60 (liq.) | 4 | −113 | 64.8 | 454 |
| LP | Lithium Perchlorate | $LiClO_4$ | $LiClO_4$ | 106 | 236 | 2.43 | (4) | −106 | | 26.5 |

[1] 2.5 kg. weight (PETN=13 cm., RDX=22 cm.) 50% height.
[2] A positive value is an endothermic value.
[3] Grams required to produce one surplus gram/atom of oxygen above the level indicated.
[4] Not explosive.

This table is included to indicate the properties of typical oxidizers. However, the list is by no means exhaustive. Other compounds of this type (polynitro aliphatic) may be employed, for example: Bis trinitroethyl urea (BTNEU), trinitroethyl trinitrobutyrate (TNETB).

That organic compositions of this general type are suitable for use as explosives should be obvious from Table I. In any event, the explosives properties of TNEOC, BTNEC and TNEOF are described in greater detail in the copending application of M. F. Hill S.N. 626,549, filed Dec. 5, 1956, now Patent No. 3,306,939 for Process for Ortho Ester Formation and assigned to the assignee of this application. Experiments have been conducted with the other compounds listed and they all were found to behave as explosives. Many other explosives not listed could also be employed as oxidizers in practicing this invention. It is necessary that these oxidizers contain a large amount of available nitro oxygen and that they form solid solutions or colloidal suspensions in the fuel polymer.

and found to be 23 cm. which is superior to that of the pure TNEOC (Table I), and similar to standard double-base propellants such as JPN or AHH.

TABLE II.—NITROPOLYMERS

| Symbol | Name | Polymer Unit Empirical Formula | Voidless Density | Unit Molecular Weight | Unit Calc. Heat of Formation | Added Oxygen Required | | |
|---|---|---|---|---|---|---|---|---|
| | | | | | | CO level | CO/CO$_2$, 1/1 | CO$_2$ |
| Pyro | Nitrocellulose, 12.60% N | C$_6$H$_7$N$_{2.5}$O$_{10}$ | 1.57 | 274 | −160 | −.5 | 2.5 | 5.5 |
| GC | Nitrocellulose, 13.45% N | C$_6$H$_7$N$_{2.77}$O$_{10.5}$ | 1.60 | 287 | −142 | −1.0 | 2.0 | 5.0 |
| DNPA | Polydinitropropyl acrylate | C$_6$H$_8$N$_2$O$_6$ | 1.48 | 204 | −127 | 4.0 | 7.0? | 10.0 |
| PNU | Polynitropolyurethane | C$_5$H$_7$N$_3$O$_6$ | 1.57 | 205 | −100 | 2.5 | 5.0 | 7.5 |
| PNU | do | C$_9$H$_{14}$N$_6$O$_{12}$ | 1.63 | 366 | −164 | 4.0 | 8.5 | 13.0 |
| PPA | Polypetrin acrylate | C$_8$H$_{11}$N$_3$O$_{11}$ | | 325 | −220 | 2.5 | 6.5 | 10.5 |

In Table II is a list of typical polymers that may be employed in practicing the invention. It will be observed that all of the polymers are nitropolymers and therefore contain oxygen available for the combustion or explosive properties. While it is true that an unnitrated polymer e.g. cellulose, may be used as the fuel, the use of the nitropolymers produces superior results since larger quantities of the nitropolymer may be used to desensitize the explosive or to enhance the physical properties of the propellant without undly degrading the energy thereof.

This invention may be carried out in one of two ways, the oxidizer and the polymeric fuel may be dissolved in a common solvent such as diethylene glycol, acetone alcohol or other organic solvent. The solvent is then removed to form a tough leathery material which may be employed as an explosive or propellant depending upon its composition.

When the polymeric fuel and the oxidizer are dissolved in the solvent, small amounts of a plasticizer and metallic powders such as aluminum, boron, magnesium and silicon may optionally be added to increase the energy of the formulation.

This process can be modified by precipitating the formulation into water from a solution such as acetone or diethylene glycol. After the precipitate is filtered and dried, dense granules of material are produced which if properly plasticized can be compression molded or extruded into tough, dense charges.

For the formulations containing nitrocellulose, this so-called shock-gel precipitation from ethyl Cellosolve and propylene glycol may be employed to produce homogeneous spheres devoid of crystalline oxidizer. This is done by dissolving the components in the shock gel solvent and adding it to water dropwise to produce the spheres which may be further processed by compression molding or casting.

The following examples are included to illustrate the principles of this invention and are not to be construed as limiting the scope of the invention to the specific illustrative examples.

EXAMPLE 1

Material:                              Percent by weight
  TNEOC _____ 70
  Nitrocellulose (13.45% N) _____ 27
  2-chloroethyl phosphate (CEF) _____  3
                                         ___
                                         100

The chloroethyl phosphate was added as a plasticizer, to decrease the brittleness of the formulation. Ten grams (total) of TNEOC, nitrocellulose, and the plasticizer were dissolved in eighty milliliters of acetone. The solvent was evaporated at 25° C. for sixteen hours; followed by evaporation in vacuo at 25° C. The resulting material was a hard, tough, amorphous-appearing mass entirely lacking in crystallinity. Upon cooling to −75° C. for 24 hours, the material became brittle but not crystalline, and resumed its original properties when allowed to return to room temperature. The impact sensitivity was measured

EXAMPLE 2

Material:                              Percent by weight
  TNEOC _____ 49
  Nitrocellulose (13.45 N) _____ 23.1
  Aluminum powder _____ 27.9
                                         ____
                                         100

Ten grams (total) of the TNEOC, nitrocellulose, and aluminum powder were dissolved in about eighty milliliters of acetone and the solvent removed as in Example 1. The resulting product was a tough, non-crystalline mass having aluminum powder dispersed throughout. Its sensitivity to impact was tested and found to be superior to that of Example 1. Its heat of detonation was 2030 cal. per gm. as compared to 1500 cal. per gm. for that of Example 1.

The addition of aluminum increases the energy of the explosive in accordance with the known effects of the addition of aluminum to explosives. Of course the Al does not dissolve in the fuel as does the oxidizer but it is uniformly dispersed throughout the mass. The effect of varying aluminum was tested for several representative explosive and propellant compositions. These compositions were made in accordance with the procedure described in Example 2. The energy of several of the compositions is tabulated in Table III. As can be seen from this table, the addition of powdered metallic material such as aluminum, silicon, magnesium and boron has the same effect on this composition as it does on other explosives. Dependent upon the effect desired, amounts up to about 45% of these powders may be added in the conventional manner.

TABLE III

| Oxidizer [1] (Percent) | Fuel (Percent) | Al (Percent) | Heat of Detonation (Cal./gm.) |
|---|---|---|---|
| TNEOC (70) | Nitrocellulose (27) | 0 | 1,500 |
| TNEOC (83.2) | PNU [2] (16.8) | 0 | 1,515 |
| TNEOC (49) | Nitrocellulose (23.1) | 27.9 | 2,030 |
| TNEOC (41.5) | Nitrocellulose (19.6) | 38.9 | 2,580 |
| TNEOC (59.7) | PNU [2] (12) | 28.3 | 2,110 |
| TNEOC (50.4) | PNU [2] (10.2) | 39.4 | 2,650 |
| BTNEN (62.7) | Nitrocellulose (37.3) | 0 | 1,625 |
| BTNEN (44.7) | Nitrocellulose (29.0) | 29 | 2,250 |
| BTNEN (38) | Nitrocellulose (22.6) | 39.4 | 2,710 |
| BTNEC (84) | PNU [2] (16) | 0 | 1,395 |

[1] Includes 3% by weight plasticizer.
[2] Polynitropolyurethane.

The sensitivity of some of the formulations of Table III was found by experiment to be rather high. Microscopic examination of each such formulation indicated that the solubility of the oxidizer in the fuel was exceeded and microscopic crystals of the oxidizer were commencing to precipitate within the fuel.

The solubility of the oxidizer in various fuels was determined in the following manner. The oxidizer and the nitropolymer were dissolved in a common solvent and evaporated on a glass surface to form a sheet which was then peeled off the glass and examined microscopically for the appearance of crystals of oxidizer. At about 50-

75% by weight oxidizer, crystallization was observed with the aid of a microscope. A characteristic solubility limit was observed for each oxidizer-polymer combination and the presence of a plasticizer was observed to alter the solubility limit. The weight percent oxidizer which can be added to representative fuels (nitro polymers) without microscopic precipitation of oxidizer crystallites taking place is set out in Table IV. Of course the solubility of any oxidizer in a given fuel may be determined empirically as the need arises. The solubility limit of virtually all of the polynitro aliphatic oxidizers is in the range 50–75% by weight.

TABLE IV.—APPROXIMATE SOLUBILITY LIMIT OF HOX's IN NITROPOLYMERS

| Polymer | Weight Percent | | | |
|---|---|---|---|---|
| | BTNEN | TNEOC | BTNEC | TNEF |
| Nitrocellulose: | | | | |
| 12.6% N | 70 | 55 | 60 | 75 |
| 13.45% N | 75 | 70 | 65 | 75 |
| Polynitropolyurethane | 65 | 55 | 60 | 70 |
| Polydinitropropyl acrylate | 75 | 70 | 70 | |

In order to determine whether or not the polynitro aliphatic oxidizer is truly in solution in the fuel one system, BTNEC/PNU, was studied by means of X-ray diffraction. This system was chosen because the fuel itself exhibits no crystalline character when studied by this method and the diffraction pattern of crystalline BTNEC is readily identified in mixtures of the two. The results of the X-ray diffraction analyses are shown in Table V.

TABLE V

| Weight Percent | | X-Ray Diffraction Pattern |
|---|---|---|
| BTNEC | PNU | |
| 0 | 100 | None. |
| 10 | 90 | Do. |
| 30 | 75 | Do. |
| 40 | 60 | Weak BTNEC. |
| 55 | 45 | Moderate BTNEC. |
| 65 | 35 | Strong BTNEC. |

It is apparent from Table V that below about 30% BTNEC in PNU XIII-A, the oxidizer is in true solution. From 30% BTNEC to 60%, crystallites are probably formed, but are too small to be observed even with a microscope. Impact sensitivities of the various formulations do not change perceptibly until crystallites of polynitro aliphatic oxidizers are visible under a microscope. Accordingly, the permissible upper limit of concentration of the oxidizer in the formulation is governed by the amount which can be added to the fuel polymer without the appearance of microscopic crystals of the oxidizer. The lower limit can of course be any value but 20–40% is optimum for propellants and 40% to the maximum is best for explosive formulations.

Several samples were prepared and the storage life of various formulations was evaluated by a 100° C. vacuum thermal stability test. Based upon experience with other explosives, it is known that gas evolution of less than 2 cc. of gas per gram of material in 48 hours indicates that the storage life of the material is satisfactory. All formulations except those based upon BTNEN were found to be satisfactory. Accordingly, it may be desirable to include a stabilizer in BTNEN formulations. While the short shelf life decreases the importance of BTNEN compositions as a military explosive, the explosive force of these compositions is so great that it may be useful in other applications where a long shelf life is not required.

EXAMPLE 3

| | Weight percent |
|---|---|
| BTNEC | 56.4 |
| Polydinitropropyl acrylate | 8.4 |
| CEF | 5.2 |
| Aluminum | 30 |

Ten grams (total) of the oxidizer, polymeric nitro fuel aluminum and the plasticizer were dissolved in 95 ml. of ethyl acetate and the solvent evaporated overnight. The aluminum powder did not, of course, dissolve; the consistency of the resulting material was more or less putty-like. Although some microscopic crystals were observed in the material, the sensitivity of the composition was less than RDX (cyclotrimethylenetrinitramine) which is a standard military explosive.

EXAMPLE 4

| | Weight percent |
|---|---|
| TNEOC | 52 |
| Nitrocellulose | 16.5 |
| Dibutyl phthalate | 6.5 |
| Magnesium | 25 |

Ten grams (total) of the oxidizer, nitropolymer magnesium powder and plasticizer were prepared in the same manner as Example 3. The sensitivity of this formulation was satisfactory and its explosive force was even greater that that of Example 3. It should be obvious to those skilled in this art that the amount of metallic powder (Al, Mg, B, or Si) added may be varied to better adapt the formulation to its intended use.

The method of preparation of the formulation described in the foregoing examples is rather time consuming since the solvent removal process is slow. In actual practice, the last stage of solvent removal is accomplished after the extension of the propellant or powder grain which results in some shrinkage of the grain.

In the preparation of many explosives, extruded grains are satisfactory. Several compositions embodying the principles of this invention were extruded as ⅛″ grains. However, the ultimate size of the grains obtainable by this process is limited by this technique. It is therefore desirable to use another technique to form large grains.

EXAMPLE 5

A typical formulation was prepared by dissolving 6 grams BTNEC and 4 grams nitrocellulose in a 50%–50% mixture of methyl Cellosolve and propylene glycol. This was added to water dropwise to produce small spheres of gelatinized formulation composed of BTNEC and nitro-cellulose. These spheres were dried and were observed to be homogeneous and devoid of crystalline oxidizer.

EXAMPLE 6

The process of Example 5 was carried out using a diethylene glycol as the solvent instead of methyl Cellosolve and propyleneglycol; the resulting dried spheres appeared to be similar to those obtained in Example 5.

The spheres made in Examples 5 and 6 are very small so that in bulk the material resembles a coarse powder which may be compression molded at 60–90° C. Several cylinders were made by compression molding powder formulations of Examples 5 and 6 as well as other compositions formed by this shock gel method. The cylinders were tough and dense and their hardness could be varied by employing different amounts of plasticizer. This technique is especially suitable for forming larger configurations adapted for use as rocket motors.

The plasticizers dibutyl phthalate and 2 chloroethyl phosphate as well as other well known plasticizers perform satisfactorily. In the event that it is desirable to increase the energy of the composition, a liquid or low melting solid explosive which plasticizes the polymers without detracting seriously from the oxygen content may be used as the plasticizer. The following Table VI indicates the compounds tested as plasticizers.

TABLE VI

| Compound | Symbol | Formula | Density, g./ml. | M.P., °C. | Impact Sensitivity, cm.[1] | Comments |
| --- | --- | --- | --- | --- | --- | --- |
| Ethyl 4,4,4-trinitrobutyrate | ETNB | $C_6H_9O_8N_3$ | 1.37 | 14 | >300 | Plasticizes NC and PNU well, appreciable vapor pressure. |
| Bis(trinitroethyl) sebacate | TNES | $C_{14}H_{20}O_{16}N_6$ | 1.34 | 42 | >300 | Plasticizes NC and PNU well, nonvolatile. |
| Bis(trinitroethyl) azelate | TNEA | $C_{13}H_{18}O_{16}N_6$ | 1.43 | 23 | 90 | Do. |
| 2,2-dinitropropanediol | DNP | $C_3H_4O_6N_2$ | 1.65 | 65 | >300 | Poor plasticizer, low solubility. |
| Trinitroethyl formal | TNEF | $C_5H_8N_6O_{14}$ | 1.73 | 65 | 7 | Plasticizes NC and PNU well, nonvolatile. |

[1] 2.5 kg. wt.—NOL machine (RDX=22 cm., TNT=180 cm.).

In every case the impact sensitivity of the plasticizer was tested by a drop test. The plasticizer was then substituted for the CEF and dibutyl phthalate of Examples 3 and 4, respectively. There was no perceptible increase in sensitivity of the finished composition containing the oxygen rich plasticizer and those containing the conventional plasticizer (CEF, etc.).

The theoretical specific impulse of propellant compositions containing a representative oxidizer, BTNEN, is 274 for a propellant containing (exclusive of polymer), 73% BTNEN and 27% Al.

This Isp. is higher than that obtained with conventional propellants. On the other hand, the nitro polymer fuel in this propellant enhances the physical properties of the finished propellant grain. Several sample "motors" were made and tested; the physical properties of the "rocket motor" were tested. There were no voids, bubbles or fissures in the grain.

The rate of burning of the propellant may be varied by modifying the composition of the motor. For example, where a low burning rate is required, in a JATO system for example, 20% oxidizer may be preferable, whereas for anti-aircraft missiles or other purposes requiring a high rate of burning 30% of the polynitro aliphatic oxidizer may be satisfactory.

Although the manner of utilizing the explosive compositions of this invention should be obvious to those skilled in the art, a detailed description of the utility of explosives and the mode of utilizing an explosive is set forth in the afore-mentioned copending application of Hill. The instant explosives can be employed in like manner. The principal use of propellants at this time is to power rockets and similar devices. The propellants may be cast or fitted within a rocket motor case having a suitable thrust nozzle at one end and secured to a body containing conventional guidance equipment and the pay load at the other. An igniter is disposed within the motor case and is preferably detonated electrically to ignite the propellant, which upon burning produces high temperature gases which exhaust through the thrust nozzle to propel the missile by reaction forces in the well-known manner in accordance with Newton's second and third laws of motion. This is explained in detail in chapter 4 of Jet Aircraft Power Systems, 2nd edition, Casamassa and Bent—McGraw-Hill.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An essentially amorphous exothermic composition consisting essentially of a nitropolymer fuel and a submicroscopic suspension of a normally crystalline polynitroaliphatic oxidizer having available oxygen in excess of that amount required to burn the oxidizer to $H_2O$ and CO, said polynitroaliphatic oxidizer being dispersed uniformly through said nitropolymer fuel, said fuel being selected from the group consisting of
   (1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate
and said fuel being selected from the group consisting of
   (2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate,
said composition containing at least about 20% by weight oxidizer but no more than that percentage of oxidizer at which microscopic crystals are observable within the composition.

2. A solid propellant composition consisting essentially of a nitropolymer fuel and a submiscroscopic suspension of normally crystalline polynitroaliphatic oxidizer containing available oxygen in excess of that required to burn the oxidizer to $H_2O$ and CO, said polynitroaliphatic oxidizer being dispersed uniformly throughout said nitropolymer fuel, said fuel being selected from the group consisting of
   (1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate
and said fuel being selected from the group consisting of
   (2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate,
said propellant containing from about 20% to 40% by weight oxidizer.

3. The process of desensitizing a crystalline polynitroaliphatic oxidizer which comprises dissolving said oxidizer together with a nitropolymer and a plasticizer in a common solvent, separating the nitropolymer, the plasticizer and the oxidizer from the solvent to form a tough mass comprising essentially an oxidizer dispersed as a submicroscopic suspension throughout the nitropolymer, said nitropolymer being selected from the group consisting of
   (1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate
and said nitropolymer being selected from the group consisting of
   (2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate.

4. The process of claim 3 wherein the plasticizer is selected from the group consisting of ethyl-4,4,4-trinitrobutyrate, bis (trinitroethyl) sebacate, bis (trinitroethyl) azelate and trinitroethyl formal and is dissolved in said solvent conjointly with the oxidizer and the nitropolymer.

5. An essentially amorphous exothermic composition consisting essentially of a nitropolymer fuel, a small amount of plasticizer and a normally crystalline polynitroaliphatic oxidizer containing available oxygen in excess of that required to burn the oxidizer to $H_2O$ and $CO$, said oxidizer being dispersed uniformly throughout said fuel as a submicroscopic suspension, said fuel being selected from the group consisting of
(1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate and said fuel being selected from the group consisting of
(2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate.

6. The composition of claim 5 wherein said oxidizer is trinitroethyl formal.

7. An exothermic composition consisting essentially of a nitropolymer fuel and about 20%–70% by weight of nitroform-derivative oxidizer dispersed uniformly throughout said nitropolymer as a noncrystalline suspension, said fuel being selected from the group consisting of
(1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate and said fuel being selected from the group consisting of
(2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate.

8. A composition consisting essentially of a nitropolymer fuel, up to about 45% high energy metallic particles and a submicroscopic suspension of a normally crystalline polynitroaliphatic oxidizer having available oxygen in excess of that required to burn the oxidizer to $H_2O$ and $CO$ uniformly dispersed through said fuel, said fuel being selected from the group consisting of
(1) nitrocellulose, polydinitropropyl acrylate, polynitropolyurethane and polypetrin acrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea and trinitroethyl trinitrobutyrate and said fuel being selected from the group consisting of
(2) polydinitropropyl acrylate, polynitropolyurethane and polypetrinacrylate when said oxidizer is selected from the group consisting of bis (trinitroethyl) nitramine, trinitroethyl orthocarbonate, bis (trinitroethyl) carbonate, trinitroethyl formal, trinitroethyl orthoformate, bis (trinitroethyl) urea, nitroglycerine and trinitroethyl trinitrobutyrate the weight ratio of said oxidizer to said fuel being about at least 20% and no more than the percentage of oxidizer at which microscopic crystals form within the composition.

9. The composition of claim 8 wherein the metallic particles are selected from the group consisting of Al, B, Mg and Si.

References Cited

UNITED STATES PATENTS

| 2,786,078 | 3/1957 | Sauer | 260—583 |
| 2,852,359 | 9/1958 | Achilles | 52—0.5 |
| 2,933,491 | 4/1960 | Klager | 52—0.5 |
| 2,933,518 | 4/1960 | Frankel et al. | 149—92 |
| 2,978,495 | 4/1961 | Frankel et al. | 52—0.5 |
| 2,978,496 | 4/1961 | Frankel et al. | 149—92 |
| 2,978,498 | 4/1961 | Frankel et al. | 52—0.5 |
| 2,978,497 | 4/1961 | Frankel et al. | 149—92 |

FOREIGN PATENTS 582,621  11/1946  Great Britain.

OTHER REFERENCES

Zachringer: "Solid Propellant Rockets—Second Stage," American Rocket Co., Box 1112, Wyandotte, Mich. (1958), pages 198, 202 and 203.

BENJAMIN R. PADGETT, Primary Examiner.

LEON D. ROSDOL, ROGER L. CAMPBELL, OSCAR R. VERTIZ, Examiners.